US008431642B2

(12) United States Patent
Tancrede et al.

(10) Patent No.: US 8,431,642 B2
(45) Date of Patent: Apr. 30, 2013

(54) POLYOLEFIN ADHESIVE COMPOSITIONS AND ARTICLES MADE THEREFROM

(75) Inventors: Jean M. Tancrede, Katy, TX (US); Christopher L. Curry, Dayton, TX (US); David R. Johnsrud, Humble, TX (US); George Rodriguez, Houston, TX (US); Fran A. Shipley, Crosby, TX (US)

(73) Assignee: Exxonmobil Chemical Patents Inc., Houston, TX (US)

( * ) Notice: Subject to any disclaimer, the term of this patent is extended or adjusted under 35 U.S.C. 154(b) by 577 days.

(21) Appl. No.: 12/472,022

(22) Filed: May 26, 2009

(65) Prior Publication Data

US 2009/0306281 A1    Dec. 10, 2009

Related U.S. Application Data

(60) Provisional application No. 61/060,014, filed on Jun. 9, 2008.

(51) Int. Cl.
*D21H 19/18* (2006.01)

(52) U.S. Cl.
USPC ............ 524/477; 524/489; 524/491; 524/583

(58) Field of Classification Search .................. 524/477, 524/489, 491, 583
See application file for complete search history.

(56) References Cited

U.S. PATENT DOCUMENTS

| | | | |
|---|---|---|---|
| 4,345,349 A | 8/1982 | Flanagan | |
| 4,540,753 A | 9/1985 | Cozewith et al. | |
| 4,960,295 A | 10/1990 | Bodouroglou | |
| 5,001,205 A | 3/1991 | Hoel | |
| 5,026,756 A | 6/1991 | Aremdt | |
| 5,066,741 A | 11/1991 | Campbell, Jr. | |
| 5,153,157 A | 10/1992 | Hlatky et al. | |
| 5,198,401 A | 3/1993 | Turner et al. | |
| 5,206,197 A | 4/1993 | Campbell, Jr. | |
| 5,241,025 A | 8/1993 | Hlatky et al. | |
| 5,384,299 A | 1/1995 | Turner et al. | |
| 5,502,124 A | 3/1996 | Crowther et al. | |
| 5,530,054 A | 6/1996 | Tse et al. | |
| 5,548,014 A | 8/1996 | Tse et al. | |
| 5,942,459 A | 8/1999 | Sugano et al. | |
| 6,034,159 A * | 3/2000 | Malcolm ........................ 524/293 | |
| 6,107,430 A * | 8/2000 | Dubois et al. .............. 526/348.5 | |
| 6,117,962 A | 9/2000 | Weng et al. | |
| 6,235,818 B1 | 5/2001 | Morizono et al. | |
| 6,399,722 B1 | 6/2002 | Szul et al. | |
| 6,747,114 B2 | 6/2004 | Karandinos et al. | |
| 6,887,941 B2 | 5/2005 | Zhou | |
| 6,906,160 B2 | 6/2005 | Stevens et al. | |
| 6,927,256 B2 | 8/2005 | Stevens et al. | |
| 6,943,215 B2 | 9/2005 | Stevens et al. | |
| 7,060,754 B2 | 6/2006 | Stevens et al. | |
| RE39,307 E | 9/2006 | Zhou | |
| 7,109,269 B2 | 9/2006 | Stevens et al. | |
| 7,199,203 B2 | 4/2007 | Stevens et al. | |
| 7,210,339 B2 | 5/2007 | Lewtas et | |
| 7,220,801 B2 | 5/2007 | Dunaway | |
| 7,223,822 B2 * | 5/2007 | Abhari et al. .................... 526/65 |
| 7,238,759 B2 | 7/2007 | Stevens et al. | |
| 7,241,493 B2 | 7/2007 | Zhou | |
| 7,250,470 B2 | 7/2007 | Stevens et al. | |
| 7,294,681 B2 * | 11/2007 | Jiang et al. ................. 526/348.2 |
| 7,319,077 B2 | 1/2008 | Mehta et al. | |
| 7,344,775 B2 | 3/2008 | Stevens et al. | |
| 7,396,782 B2 | 7/2008 | Blenke et al. | |
| 7,476,710 B2 | 1/2009 | Mehta et al. | |
| 7,488,777 B2 | 2/2009 | Inoue | |
| 7,524,910 B2 * | 4/2009 | Jiang et al. .................... 526/348 |
| 7,541,402 B2 | 6/2009 | Abhari et al. | |
| 7,550,528 B2 | 6/2009 | Abhari et al. | |
| 7,700,707 B2 | 4/2010 | Abhari et al. | |
| 7,750,078 B2 | 7/2010 | Curry | |
| 2002/0193474 A1 * | 12/2002 | Daily et al. .................... 524/109 |
| 2004/0045666 A1 | 3/2004 | Gong et al. | |
| 2004/0127614 A1 * | 7/2004 | Jiang et al. .................... 524/270 |
| 2004/0138392 A1 | 7/2004 | Jiang et al. | |
| 2004/0220320 A1 * | 11/2004 | Abhari et al. .................. 524/487 |
| 2004/0220336 A1 * | 11/2004 | Abhari et al. .................... 525/70 |
| 2004/0249046 A1 * | 12/2004 | Abhari et al. .................. 524/474 |
| 2007/0021566 A1 | 1/2007 | Tse et al. | |
| 2008/0081868 A1 | 4/2008 | Jiang et al. | |
| 2008/0081878 A1 | 4/2008 | Jiang et al. | |
| 2008/0262148 A1 | 10/2008 | Bach et al. | |
| 2009/0069475 A1 | 3/2009 | Jiang et al. | |
| 2009/0306281 A1 | 12/2009 | Tancrede et al. | |

FOREIGN PATENT DOCUMENTS

| CA | 2338221 | 2/2000 |
|---|---|---|
| EP | 0 277 003 | 8/1988 |

(Continued)

OTHER PUBLICATIONS

Baker Hughes ("Polywax Polyethylenes").*

(Continued)

*Primary Examiner* — Ling Choi
*Assistant Examiner* — Wenwen Cai

(57) ABSTRACT

Provided are adhesive compositions composed of a polyolefin composition comprising at least about 50 wt. % polypropylene and at least one wax. The polymer compositions have a Dot T-Peel of about 1 Newton or more, a branching index (g') of 0.95 or less measured at the Mz of the polymer, a molecular weight of 100,000 or less, and the adhesive compositions has a fast set time. The packaging industry desires adhesive compositions having a fast set time, such as those setting in less than five seconds from a molten state at conventional packaging operating temperatures to a solid or quasi solid having favorable Dot T-Peel, set time, and or fiber tear adhesion properties. Polymer based adhesives performing within this window are a favorable alternative to conventional formulated adhesives. The provided adhesive compositions exhibit a favorable balance of properties such as high adhesive strength, wide temperature operating window, and fast set time.

8 Claims, No Drawings

FOREIGN PATENT DOCUMENTS

| | | |
|---|---|---|
| EP | 0 277 004 | 8/1988 |
| EP | 0 495 375 | 7/1992 |
| EP | 0 500 944 | 9/1992 |
| EP | 0 520 732 | 12/1992 |
| EP | 0 570 982 | 11/1993 |
| EP | 0 886 656 | 12/1998 |
| EP | 1 125 980 | 8/2001 |
| EP | 1 243 248 | 9/2002 |
| WO | WO 96/33227 | 10/1996 |
| WO | WO 97/22639 | 6/1997 |
| WO | 97/48777 | 12/1997 |
| WO | 98/46694 | 10/1998 |
| WO | WO 98/43983 | 10/1998 |
| WO | 00/05306 | 2/2000 |
| WO | WO 01/30862 | 5/2001 |
| WO | 02/34856 | 5/2002 |
| WO | 2005/100501 | 10/2005 |
| WO | 2006/044149 | 4/2006 |
| WO | 2008/042037 | 4/2008 |

OTHER PUBLICATIONS

Clariant ("Licomont AR 504").*
B. Wielage et al., "*Processing of Natural-Fibre Reinforced Polymers and the Resulting Dynamic-Mechanical Properties*", Journal of Materials Processing Technology, 2003, vol. 139, pp. 140-146.
Ver Strate et al., Near Monodisperse Ethylene-Propylene Copolymers by Direct Ziergler-Natta Polymerization. Preparation, Characterization, Properties, Macromolecules, 1988, vol. 21, No. 12, pp. 3360-3371.
Sun et al., Effect of Short Chain Branching on the Coil Dimensions of Polyolefins in Dilute Solutions, Macromolecules, 2001, vol. 34, No. 19, pp. 6812-6820.
Randall, Long-Chain Branching in Polyethylene, Journal of Macromolecular Science—Reviews in Macromolecular Chemistry and Physics, vol. C29, Nos. 2 and 3, pp. 285-297, 1989.
Weng et al., Synthesis of vinyl-terminated isotactic poly(propylene), Macromolecular Rapid Communication, 2000, vol. 21, No. 16, pp. 1103-1107.

* cited by examiner

US 8,431,642 B2

POLYOLEFIN ADHESIVE COMPOSITIONS AND ARTICLES MADE THEREFROM

CROSS REFERENCE TO RELATED APPLICATIONS

This application claims priority to and benefit of U.S. Application No. 61/060,014, filed Jun. 9, 2008 and is related to U.S. Application Nos. 60/418,482, filed Oct. 15, 2002, 60/460,714, filed Apr. 4, 2003, Ser. No. 10/687,508, issued as U.S. Pat. No. 7,294,681, Ser. No. 10/686,951, issued as U.S. Pat. No. 7,524,910, Ser. No. 10/825,380, issued as U.S. Pat. No. 7,223,822, Ser. No. 10/825,635, filed Apr. 15, 2004, Ser. No. 10/825,349, filed Apr. 15, 2004, and Ser. No. 10/825,348, filed Apr. 15, 2004, each of which is herein incorporated by reference in its entirety.

FIELD OF THE INVENTION

This invention relates to polyolefin adhesive compositions and articles made therefrom, and more particularly to polyolefin adhesive compositions having a fast set time.

BACKGROUND OF THE INVENTION

The adhesion industry continues to search for adhesive compositions having a balance of properties. For example, the adhesive industry has pursued polymer based compositions that can be used as adhesives.

Accordingly there exists a current and long felt need for adhesive compositions that overcome known deficiencies in conventional compositions and have advantageous processing properties.

SUMMARY OF THE INVENTION

Provided are adhesive compositions composed of (1) a polyolefin composition comprising at least about 50 weight percent polypropylene and (2) at least one wax. The polyolefin composition has a Dot T-Peel of about 1 Newton or more, a branching index (g') of 0.95 or less measured at the z-average molecular weight of the polymer and a molecular weight of 100,000 or less. The adhesive compositions have a fast set time.

The packaging industry desires adhesive compositions having a fast set time, such as those setting in less than five seconds from a molten state at conventional packaging operating temperatures to a solid or quasi solid having favorable Dot T-Peel, set time, and/or fiber tear adhesion properties. Polymer based adhesives performing within this window are a favorable alternative to conventional formulated adhesives. The provided adhesive compositions exhibit a favorable balance of properties such as high adhesive strength, wide temperature operating window, and fast set time.

DETAILED DESCRIPTION OF ILLUSTRATIVE EMBODIMENTS

Provided are adhesive compositions composed of (1) a polyolefin composition comprising at least about 50 weight percent polypropylene and (2) at least one wax. The polyolefin composition has a Dot T-Peel of about 1 Newton or more, a branching index (g') of 0.95 or less measured at the z-average molecular weight of the polymer and a molecular weight of 100,000 or less. The adhesive compositions have a fast set time.

The packaging industry desires adhesive compositions having a fast set time, such as those setting in less than five seconds from a molten state at conventional packaging operating temperatures to a solid or quasi solid having favorable Dot T-Peel, set time, and or fiber tear adhesion properties. Polymer based adhesives performing within this window are a favorable alternative to conventional formulated adhesives. The provided adhesive compositions exhibit a favorable balance of properties such as high adhesive strength, wide temperature operating window, and fast set time.

Polymer Compositions

The polymer compositions are composed of polyolefin compositions, which include propylene polymers. Propylene polymers are polymers composed of propylene monomers. As used herein "polypropylene", "polypropylene polymer(s)", or "propylene polymer(s)" mean homopolymers, copolymers, terpolymers, higher order copolymers, or interpolymers made from propylene derived units, or combinations thereof.

As used herein "homopolymer" means polymers resulting from the polymerization of a single monomer, i.e., a polymer consisting essentially of a single type of repeating unit.

As used herein, the term "copolymer(s)" refers to polymers formed by the polymerization of at least two different monomers. For example, the term "copolymer" includes the copolymerisation reaction product of propylene and an α-olefin, such as for example, 1-hexene.

"Polypropylene" includes stereoregular polypropylene, stereoregular polypropylene segments separated by amorphous polypropylene, amorphous polypropylene, polypropylene copolymers, polypropylene terpolymers, and higher order polypropylene copolymers. As used herein "stereoregular polypropylene" means stereoregular propylene sequences long enough to crystallize under conditions known to those skilled in the art.

Preferably, polypropylene polymers are propylene-based copolymer, i.e., propylene copolymer, which may also be referred to as a propylene-α-olefin copolymer. Propylene copolymer includes one or more units, i.e., mer units, derived from propylene, one or more comonomer units derived from ethylene or α-olefins including from 4 to about 20 carbon atoms. Optionally one or more comonomer units derive from dienes.

In one or more embodiments, the α-olefin comonomer units derive from ethylene, 1-butene, 1-hexane, 4-methyl-1-pentene and/or 1-octene. Exemplary alpha-olefins are selected from the group consisting of ethylene, butene-1, pentene-1,2-methylpentene-1,3-methylbutene-1, hexene-1, 3-methylpentene-1,4-methylpentene-1,3,3-dimethylbutene-1, heptene-1, hexene-1, methylhexene-1, dimethylpentene-1, trimethylbutene-1, ethylpentene-1, octene-1, methylpentene-1, dimethylhexene-1, trimethylpentene-1, ethylhexene-1, methylethylpentene-1, diethylbutene-1, propylpentane-1, decene-1, methylnonene-1, nonene-1, dimethyloctene-1, trimethylheptene-1, ethyloctene-1, methylethylbutene-1, diethylhexene-1, dodecene-1, and hexadodecene-1.

Exemplary diene comonomer units include 5-ethylidene-2-norbornene, 5-vinyl-2-norbornene, divinyl benzene, 1,4-hexadiene, 5-methylene-2-norbornene, 1,6-octadiene, 5-methyl-1,4-hexadiene, 3,7-dimethyl-1,6-octadiene, 1,3-cyclopentadiene, 1,4-cyclohexadiene, and dicyclopentadiene.

Propylene polymers include no more than about 25 weight percent (wt. %) of α-olefin comonomers, based on the weight of the propylene copolymer. Preferably, propylene copolymers include no more than about 20 wt. %, or no more than about 15 wt. % of α-olefin comonomers. More preferably, propylene copolymers include no more than about 12, or no more than about 10 wt. % of α-olefin comonomers. Still more preferably, propylene copolymers include no more than about 9, or no more than about 7 wt. % of α-olefin comonomers. In one or more embodiments propylene copolymers include from about 3.0 to about to about 7.0 wt. % of α-olefin comonomers. In other embodiments, propylene copolymers include from about 4 to about 6 wt. % of α-olefin comonomers. In still other embodiments, propylene copolymers include no more than about 5 wt. % or from about 3 to about 5 wt. % of α-olefin comonomers.

In some embodiments, polypropylenes have a melt index in dg/min ("MI"), according to ASTM D-1238 at 2.16 kg and 190° C., of not more than about 10, or not more than about 6.5, or not more than about 6, or not more than about 5.5, and in other embodiments not more than about 5.

In some embodiments, the melt flow rate ("MFR") of polypropylenes, as measured according to ASTM D-1238 at 2.16 kg weight and 230° C., is at least about 0.2 dg/min, or of at least about 0.2 dg/min, or at least about 0.5 dg/min, and in other embodiments at least about 1.0 dg/min. Polypropylenes have a melt flow rate of not more than about 3500 dg/min, or not more than about 3000 dg/min, or not more than about 2500 dg/min, or not more than about 2000 dg/min, or not more than about 1000 dg/min, or not more than about 350 dg/min, or not more than about 100 dg/min. In one or more embodiments, polypropylenes have an MFR of from about 0.5 dg/min to about 2000 dg/min, or from about 1 dg/min to about 350 dg/min, or from about 1 dg/min to about 30 dg/min, or from about 10 dg/min to about 30 dg/min, and in other embodiments from about 1 dg/min to about 10 dg/min. In a preferred embodiment, polypropylenes have an MFR of from about 8 dg/min to about 2000 dg/min.

In some embodiments, polypropylenes have a Mooney viscosity [ML (1+4) @125° C.], as determined according to ASTM D1646, of less than about 100, or less than about 75, or less than about 60, and in other embodiments less than about 30.

Polypropylenes have a weight average molecular weight (Mw) of about 100,000 or less, preferably about 80,000 or less, preferably about 70,000 or less, more preferably about 60,000 or less, more preferably about 50,000 or less, more preferably about 40,000 or less, more preferably about 30,000 or less, more preferably about 20,000 or less, more preferably about 10,000 or less. In some embodiments Mw is also at least about 10,000, more preferably at least about 15,000.

In one embodiment, polypropylenes have a number average molecular weight (Mn) of from about 2,500 to about 2,500,000 g/mole, or from about 5,000 to about 500,000 g/mole, or from about 10,000 to about 250,000 g/mole, and in other embodiments a Mn of from about 25,000 to about 200,000 g/mole.

The molecular weight distribution index (MWD=(Mw/Mn)) of polypropylenes is from about 1 to about 40, or from about 1 to about 5, or from about 1.8 to about 5, and in other embodiments from about 1.8 to about 3. Techniques for determining the molecular weight (Mn and Mw) and molecular weight distribution (MWD) may be found in U.S. Pat. No. 4,540,753, Verstrate et al., 21 *Macromolecules*, 3360 (1988), and T. Sun, P. Brant, R. R. Chance, and W. W. Graessley, *Macromolecules*, Volume 34, Number 19, 6812-6820, (2001), each of which is herein incorporated by reference in its entirety.

The propylene branching index, g', is measured using Size Exclusion Chromatography (SEC) with an on-line viscometer (SEC-VIS) and are reported at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-averaged molecular weight ($M_v$) as the branched polymer. $\eta_l = KM_v^{\alpha}$, K and α are measured values for linear polymers and should be obtained on the same SEC-DRI-LS-VIS instrument as the one used for branching index measurement. For polypropylene samples provided herein, K=0.0002288 and α=0.705 were used. The SEC-DRI-LS-VIS method obviates the need to correct for polydispersities, since the intrinsic viscosity and the molecular weight are measured at individual elution volumes, which contain narrowly dispersed polymer. Linear polymers selected as standards for comparison should be of the same viscosity average molecular weight and comonomer content. Linear character for polymer containing C2 to C 10 monomers is confirmed by Carbon-13 NMR the method of Randall (Rev. Macromol. Chem. Phys., C29 (2&3), p. 285-297).

The size exclusion chromatograph is operated with three Polymer Laboratories PLgel 10 mm Mixed-B columns, a nominal flow rate 0.5 cm³/min, and a nominal injection volume 300 microliters is common to both detector configurations. The various transfer lines, columns and differential refractometer (the DRI detector, used mainly to determine eluting solution concentrations) are contained in an oven maintained at 135° C.

A typical LALLS detector is the model 2040 dual-angle light scattering photometer (Precision Detector Inc.). Its flow cell, located in the SEC oven, uses a 690 nm diode laser light source and collects scattered light at two angles, 15° and 90°. Only the 15° output was used in these experiments. Its signal is sent to a data acquisition board (National Instruments) that accumulates readings at a rate of 16 per second. The lowest four readings are averaged, and then a proportional signal is sent to the SEC-LALLS-VIS computer. The LALLS detector is placed after the SEC columns, but before the viscometer.

A typical viscometer is a high temperature Model 150R (Viscotek Corporation). It consists of four capillaries arranged in a Wheatstone bridge configuration with two pressure transducers. One transducer measures the total pressure drop across the detector, and the other, positioned between the two sides of the bridge, measures a differential pressure. The specific viscosity for the solution flowing through the viscometer is calculated from their outputs. The viscometer is inside the SEC oven, positioned after the LALLS detector but before the DRI detector.

Solvent for the SEC experiment was prepared by adding 6 grams of butylated hydroxy toluene (BHT) as an antioxidant to a 4 liter bottle of 1,2,4 Trichlorobenzene (TCB)(Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC.

Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units are 1.463 g/ml at room temperature and 1.324 g/ml at 135° C. The injection concentration ranged from 1.0 to 2.0 mg/ml, with lower concentrations being used for higher molecular weight samples.

Prior to running each sample the DRI detector and the injector were purged. Flow rate in the apparatus was then increased to 0.5 ml/minute, and the DRI was allowed to stabilize for 8-9 hours before injecting the first sample. The argon ion laser was turned on 1 to 1.5 hours before running samples by running the laser in idle mode for 20-30 minutes and then switching to full power in light regulation mode.

The polypropylene branching index is less than about 1.0 measured at the Mz of the polymer. Preferably the branching index is about 0.95 or less, about 0.9 or less, about 0.85 or less, about 0.8 or less, about 0.7 or less, about 0.6 or less, 0.5 or less as measured at the Mz of the polymer.

The propylene polymer has a peak melting point (Tm) between 40 and 250° C., or between 60 and 190° C., or between about 60 and 150° C., or between 80 and 130° C. In some embodiments the peak melting point is between 60 and 160° C. In other embodiments the peak melting point is between 124-140° C. In other embodiments the peak melting temperature is between 40-130° C.

In some embodiments the propylene polymer described above has a viscosity (also referred to a Brookfield Viscosity or Melt Viscosity) of 90,000 mPa·sec or less at 190° C. (as measured by ASTM D 3236 at 190° C.); or 80,000 or less, or 70,000 or less, or 60,000 or less, or 50,000 or less, or 40,000 or less, or 30,000 or less, or 20,000 or less, or 10,000 or less, or 8,000 or less, or 5000 or less, or 4000 or less, or 3000 or less, or 1500 or less, or between 250 and 6000 mPa·sec, or between 500 and 5500 mPa·sec, or between 500 and 3000 mPa·sec, or between 500 and 1500 mPa·sec, and/or a viscosity of 8000 mPa·sec or less at 160° C. (as measured by ASTM D 3236 at 160° C.); or 7000 or less, or 6000 or less, or 5000 or less, or 4000 or less, or 3000 less, or 1500 or less, or between 250 and 6000 mPa·sec, or between 500 and 5500 mPa·sec, or between 500 and 3000 mPa·sec, or between 500 and 1500 mPa·sec. In other embodiments the viscosity is 200,000 mPa·sec or less at 190° C., depending on the application. In other embodiments the viscosity is 50,000 mPa·sec or less depending on the applications.

The propylene polymer has a heat of fusion of about 70 J/g or less, or about 60 J/g or less, or about 50 J/g or less; or about 40 J/g or less, or about 30 J/g or less, or about 20 J/g or less and greater than zero, or about greater than 1 J/g, or greater than about 10 J/g, or between about 20 and about 50 J/g.

The polypropylene has a Shore A Hardness as measured by ASTM 2240 of about 95 or less, about 70 or less, or about 60 or less, or about 50 or less, or about 40 or less or about 30 or less, or about 20 or less. In other embodiments the propylene polymer has a Shore A Hardness of about 5 or more, about 10 or more, or about 15 or more. In certain applications, such as packaging, the Shore A Hardness is preferably about 60 to about 70.

In some embodiments the polypropylene has a Shear Adhesion Fail Temperature (SAFT), as measured by ASTM 4498, of about 200° C. or less, or from about 40 to about 150° C., or from about 60 to about 130° C., or from about 65 to about 110° C., or from about 70 to about 80° C. In other embodiments the polypropylene has a SAFT of from about 130 to about 140° C.

The polypropylene has a Dot T-Peel of between about 1 Newton and about 10,000 Newtons, or from about 3 and about 4000 Newtons, or between about 5 and about 3000 Newtons, or between about 10 and about 2000 Newtons, or between about 15 and about 1000 Newtons.

Dot T-Peel is determined according to ASTM D 1876, except that the specimen is produced by combining two 1 inch by 3 inch (2.54 cm×7.62 cm) Kraft paper substrate cut outs with a dot of adhesive with a volume that, when compressed under a 500 gram weight occupies about 1 square inch of area (1 inch=2.54 cm). Once made all the specimens are pulled apart in side by side testing (at a rate of 2 inches per minute) by a machine that records the destructive force of the insult being applied. The maximum force achieved for each sample tested was recorded and averaged, thus producing the Average Maximum Force which is reported as the Dot T-Peel.

In some embodiments, the propylene polymer described above also has a crystallization point (Tc) between 20 and 110° C. In some embodiments the Tc is between 70 to 100° C. In other embodiments the Tc is between 30 to 80° C. In other embodiments the Tc is between 20 to 50° C.

In other embodiments, propylene polymers described above have a melt index ratio (I10/I2) of 6.5 or less, preferably 6.0 or less, preferably 5.5 or less, preferably 5.0 or less, preferably 4.5 or less, preferably between 1 and 6.0. (I10 and I2 are measured according to ASTM 1238 D, 2.16 kg, 190° C.).

In another embodiment, propylene polymers described above have a melt index (as determined by ASTM 1238 D, 2.16 kg, 190° C.) of 25 dg/min or more, preferably 50 dg/min or more, preferably 100 dg/min or more, more preferably 200 dg/min or more, more preferably 500 dg/nm or more, more preferably 2000 dg/min or more.

The polyolefin composition comprises at least about 50 wt. % propylene, preferably at least about 60% propylene, alternatively at least about 70% propylene, alternatively at least about 80% propylene, or at least about 90 weight percent propylene.

The polyolefin composition has an amorphous content of at least about 40 wt. %. Preferably, the polyolefin composition has an amorphous content of at least about 50 wt. %, alternatively at least about 60 wt. %, alternatively at least about 70 wt. %. In some embodiments the polyolefin composition has an amorphous content from about 50 wt. %, to about 99 wt. %. Percent amorphous content is determined using Differential Scanning Calorimetry measurement according to ASTM E 794-85.

The polyolefin composition has a crystallinity of about 40 wt. % or less. Preferably, the polyolefin composition has a crystallinity of about 30 wt. % or less, alternatively about 20 wt. % or less. In some embodiments, the polyolefin composition has a crystallinity of from about 5 wt. % to about 40 wt. % or from about 10 wt. % to about 30 wt. %. Percent crystallinity content is determined using Differential Scanning Calorimetry measurement according to ASTM E 794-85.

In some embodiments, the polyolefin composition has a molecular weight distribution (Mw/Mn) of at least 1.5, preferably at least 2, preferably at least 5, preferably at least 10, even alternatively at least 20. In other embodiments the Mw/Mn is 20 or less, 10 or less, even 5 or less.

In at least one embodiment, the polyolefin composition has at least two molecular weights fractions present at greater than about 2 wt. %, preferably greater than about 20 wt. %, each based upon the weight of the polymer as measured by gel permeation chromatography (GPC). The fractions can be identified on a GPC trace by observing two distinct populations of molecular weights. For example, the weight fractions are confirmed as percent by a GPC trace showing a peak at 20,000 Mw and another peak at 50,000 Mw where the area under the first peak represents more than 2 wt. % of the polymer and the area under the second peak represents more than 2 wt. % of the polymer. One skilled in the art of gel permeation chromatography will recognize the many possible combinations of molecular weight fractions.

In some embodiments, the polyolefin composition has about 20 wt. % or more of hexane room temperature soluble fraction, and about 70 wt. % or less, preferably about 50 weight % or less of Soxhlet boiling heptane insolubles, based upon the weight of the polyolefin composition.

Soxhlet heptane insoluble refers to one of the fractions obtained when a sample is fractionated using successive solvent extraction technique. The fractionations are carried out in two steps: one involves room temperature solvent extraction, the other soxhlet extraction. In the room temperature solvent extraction, about one gram of polymer is dissolved in 50 ml of solvent (e.g., hexane) to isolate the amorphous or very low molecular weight polymer species. The mixture is stirred at room temperature for about 12 hours. The soluble fraction is separated from the insoluble material using filtration under vacuum. The insoluble material is then subjected to a Soxhlet extraction procedure. This involves the separation of polymer fractions based on their solubility in various solvents having boiling points from just above room temperature to 110° C. The insoluble material from the room temperature solvent extraction is first extracted overnight with a solvent such as hexane and heptane (Soxhlet); the extracted material is recovered by evaporating the solvent and weighing the residue. The insoluble sample is then extracted with a solvent having higher boiling temperature such as heptane and after solvent evaporation, it is weighed. The insolubles and the thimble from the final stage are air-dried in a hood to evaporate most of the solvent, then dried in a nitrogen-purged vacuum oven. The amount of insoluble left in the thimble is then calculated, provided the tare weight of the thimble is known.

In some embodiments, the polyolefin composition has a heptane insoluble fraction of about 70 weight % or less, based upon the weight of the starting polymer, and the heptane insoluble fraction has branching index g' of 0.9 (preferably 0.7) or less as measured at the Mz of the polymer. In a preferred embodiment the composition also has at least about 20 weight % hexane soluble fraction, based upon the weight of the starting polymer. In another embodiment, the polyolefin composition has a heptane insoluble fraction of about 70 weight % or less, based upon the weight of the starting polymer and a Mz between 20,000 and 5000,000 of the heptane insoluble portion. In a preferred embodiment the composition also has at least 20 weight % hexane soluble fraction, based upon the weight of the starting polymer. In another embodiment the polymers produced have a hexane soluble portion of at least about 20 wt. %, based upon the weight of the starting polymer.

In some embodiments, the polyolefin composition comprises propylene and from 0 to 50 mole % ethylene, preferably from 0 to 30 mole % ethylene, more preferably from 0 to 15 mole % ethylene, more preferably from 0 to 10 mole % ethylene, more preferably from 0 to 5 mole % ethylene.

In a preferred embodiment the polymer comprises propylene and from 0 to 50 mole % butene, preferably from 0 to 30 mole % butene, more preferably from 0 to 15 mole % butene, more preferably from 0 to 10 mole % butene, more preferably from 0 to 5 mole % butene.

In a preferred embodiment the polymer comprises propylene and from 0 to 50 mole % hexene, preferably from 0 to 30 mole % hexene, more preferably from 0 to 15 mole % hexene, more preferably from 0 to 10 mole % hexene, more preferably from 0 to 5 mole % hexene.

Methods of Making Polymer Compositions

Polypropylene may be prepared by any conventional synthesis processes. Preferably, polypropylene is prepared utilizing one or more catalysts, which are typically metallocene catalysts.

In single catalyst systems, polymer compositions containing amorphous and semi-crystalline components may be prepared in a single reactor to yield desired property balance. In particular, aPP-g-scPP branch structures may be produced in-situ in a continuous solution reactor.

In multiple catalyst systems, at least one catalyst is selected as being capable of producing essentially atactic polypropylene (aPP), and at least one other catalyst, e.g., a second catalyst, is selected as being capable of producing isotactic polypropylene (iPP) under the polymerization conditions utilized.

One or more reactors may be utilized to prepare polymer compositions. Multiple reactors may be operated in series or in parallel. Reaction components, catalyst systems, and/or optional modifiers are added in batches or continuously as a solution or slurry. Catalyst system components are added either separately to the reactor, activated in-line just prior to the reactor, or preactivated and pumped as an activated solution or slurry to the reactor. A preferred method is two solutions activated in-line.

For more information on methods to introduce multiple catalysts into reactors, please see U.S. Pat. No. 6,399,722, and WO0130862A1, which are herein incorporated by reference in there entirety. While these references may emphasize gas phase reactors, the techniques described are equally applicable to other types of reactors, including continuous stirred tank reactors and slurry loop reactors.

Catalyst components are added to the first reactor in the series, the second reactor in series, or both reactors either simultaneously, or in coordinated time with each other. Catalyst components may also be added to both reactors, with one component being added to first reaction and another component to other reactors.

The process can be carried out in a continuous stirred tank reactor, batch reactor or plug flow reactor. These reactors may have internal cooling or heating. The monomer feed may be refrigerated. General process conditions are described in U.S. Pat. No. 5,001,205, WO 96/33227, and WO 97/22639, which are each incorporated by reference in their entireties.

Preferably, under the polymerization conditions utilized, incorporation of aPP and iPP polymer chains occur within the in-reactor blend such that an amount of amorphous polypropylene present in the POA polymer is grafted to isotactic polypropylene, represented herein as (aPP-g-iPP) and/or such that an amount of isotactic polypropylene is grafted to amorphous polypropylene, represented herein as (iPP-g-aPP). Preferably, the polymers are prepared in a solution phase, slurry, or bulk phase polymerization process.

Without being limited by theory, it is believed that the fraction of branch-block and the level of branching depend on the availability of macromonomers with unsaturated chain end and macromonomer incorporation capability of the specific catalyst. To increase the population of aPP-g-scPP branch-block composition, one typically operates within a process window that favors macromonomer production and insertion. Such conditions have been described in U.S. Pat. No. 6,117,962 and the journal article by W. Weng et al., Macromol. Rapid Commun., 2000, 21, 1103-1107.

Exemplary continuous processes for preparing polymer compositions are composed of one or more steps for (a) combining monomer, optional solvent, catalyst, and activator in a reactor system, (b) withdrawing polymer solution from the reactor system, (c) removing solvent, if present, from the polymer solution, (d) quenching the reaction, and (e) devolatilizing the polymer solution to form molten polymer.

Catalyst Compounds

Any catalyst compound that can produce the desired polymer species may be used to prepare the polypropylenes described herein. "Transition metal compounds" used herein may also be referred to as catalyst precursors, pre-catalyst compounds, or catalyst compounds. These terms are used interchangeably. A catalyst system is a combination of a catalyst precursor and an activator.

Single-site metallocene catalysts or catalyst systems are preferred. Suitable single site metallocene catalysts for use herein include those obeying the following general formula (1):

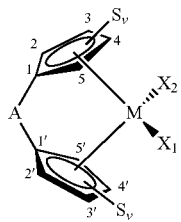

wherein:

M is a Group 3, 4, 5 or 6 transition metal atom, or a lanthanide metal atom, or actinide metal atom, preferably a Group 4 transition metal atom selected from titanium, zirconium or hafnium;

each cyclopentadienyl (Cp) ring is substituted with from zero to four substituent groups S, each substituent group S being, independently, a hydrocarbyl, substituted-hydrocarbyl, halocarbyl, substituted-halocarbyl, hydrocarbyl-substituted organometalloid, halocarbyl-substituted organometalloid, disubstituted boron, disubstituted pnictogen, substituted chalcogen or halogen radical, provided that two adjacent S groups may joined to form a $C_4$ to $C_{20}$ ring to give a saturated or unsaturated polycyclic ligand;

the subscript "v" denotes the carbon atom on the Cp-ring to which the substituent is bonded;

A is a bridging group; and $X_1$ and $X_2$ are, independently, hydride radicals, hydrocarbyl radicals, substituted hydrocarbyl radicals, halocarbyl radicals, substituted halocarbyl radicals, and hydrocarbyl- and halocarbyl-substituted organometalloid radicals, substituted pnictogen radicals, or substituted chalcogen radicals; or $X_1$ and $X_2$ are joined and bound to the metal atom to form a metallacycle ring containing from about 3 to about 20 carbon atoms; or $X_1$ and $X_2$ together can be an olefin, diolefin or aryne ligand; or when Lewis-acid activators, such as methylalumoxane, which are capable of donating an $X_1$ ligand as described above to the transition metal component are used, $X_1$ and $X_2$ may independently be a halogen, alkoxide, aryloxide, amide, phosphide or other univalent anionic ligand or both $X_1$ and $X_2$ can also be joined to form a anionic chelating ligand and with the proviso that $X_1$ and $X_2$ are not a substituted or unsubstituted cyclopentadienyl ring.

Preferably, A is a bridging group containing boron or a Group 14, 15 or 16 element. Examples of suitable bridging groups include $R'_2C$, $R'_2Si$, $R'_2Ge$, $R'_2CCR'_2$, $R'_2CCR'_2CR'_2$, $R'_2CCR'_2CR'_2CR'_2$, $R'C\circledcirc CR'$, $R'C=CR'CR'_2$, $R'_2CCR'=CR'_2$, $CR'_2$, $R'C=CR'CR'_2$, $R'C=CR'CR'_2CR'_2$, $R'_2CSiR'_2$, $R'_2SiSiR'_2$, $R'_2CSiR'_2CR'_2$, $R'_2SiCR'_2SiR'_2$, $R'C=CR'SiR'_2$, $R'_2CGeR'_2$, $R'_2GeGeR'_2$, $R'_2CGeR'_2CR'_2$, $R'_2GeCR'_2GeR'_2$, $R'_2SiGeR'_2$, $R'C=CR'GeR'_2$, $R'B$, $R'_2C-BR'$, $R'_2C-BR'-CR'_2$, $R'N$, $R'P$, $O$, $S$, $Se$, $R'_2C-O-CR'_2$, $R'_2CR'_2C-O-CR'_2CR'_2$, $R'_2C-O-CR'_2CR'_2$, $R'_2C-O-CR'=CR'$, $R'_2C-S-CR'_2$, $R'_2CR'_2C-S-CR'_2CR'_2$, $R'_2C-S-CR'_2CR'_2$, $R'_2C-S-CR'=CR'$, $R'_2C-Se-CR'_2$, $R'_2CR'_2C-Se-CR'_2CR'_2$, $R'_2C-Se-CR'_2CR'_2$, $R'_2C-Se-CR'=CR'$, $R'_2C-N=CR'$, $R'_2C-NR'-CR'_2$, $R'_2C-NR'-CR'_2CR'_2$, $R'_2C-NR'-CR'=CR'$, $R'_2CR'_2C-NR'-CR'_2CR'_2$, $R'_2C-P=CR'$, and $R'_2C-PR'-CR'_2$ where R' is hydrogen or a $C_1$-$C_{20}$ containing hydrocarbyl, substituted hydrocarbyl, halocarbyl, substituted halocarbyl, silylcarbyl or germylcarbyl substituent and optionally two or more adjacent R' may join to form a substituted or unsubstituted, saturated, partially unsaturated or aromatic, cyclic or polycyclic substituent. Preferred examples for the bridging group Y include $CH_2$, $CH_2CH_2$, $CH(CH_3)_2$, O, S, $SiMe_2$, $SiPh_2$, SiMePh, $Si(CH_2)_3$ and $Si(CH_2)_4$.

Catalyst Compound Activators and Activation Methods

The polymerization pre-catalyst compounds, described above, are typically activated by conventional methods to yield compounds having a vacant coordination site that will coordinate, insert, and polymerize olefin(s). For the purposes of this patent specification and appended claims, the terms "cocatalyst" and "activator" are used herein interchangeably and are defined to be any compound which can activate any catalyst compounds by converting a neutral catalyst compound to a catalytically active catalyst compound cation. Non-limiting activators, for example, include alumoxanes, aluminum alkyls, ionizing activators, which may be neutral or ionic, and conventional-type cocatalysts. Preferred activators typically include alumoxane compounds, modified alumoxane compounds, and ionizing anion precursor compounds that abstract one reactive, σ-bound, metal ligand making the metal complex cationic and providing a charge-balancing noncoordinating or weakly coordinating anion.

Alumoxane activators are preferred activators. Alumoxanes are generally oligomeric compounds containing —Al($R^1$)—O— sub-units, where $R^1$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide, alkoxide or amide. Mixtures of different alumoxanes and modified alumoxanes may also be used.

In general the combined pre-catalyst compounds and the activator are combined in ratios of about 1:10,000 to about 10:1. When alumoxane or aluminum alkyl activators are used, the combined pre-catalyst-to-activator molar ratio is from 1:5000 to 10:1, alternatively from 1:1000 to 10:1; alternatively, 1:500 to 2:1; or 1:300 to 1:1. When ionizing activators are used, the combined pre-catalyst-to-activator molar ratio is from 10:1 to 1:10; 5:1 to 1:5; 2:1 to 1:2; or 1.2:1 to 1:1. Multiple activators may be used, including using mixes of alumoxanes or aluminum alkyls with ionizing activators.

As a specific example, a method for preparing propylene-based macromonomers having a high percentage of vinyl terminal bonds involves:

a) contacting, in solution, propylene, optionally a minor amount of copolymerizable monomer, with a catalyst composition containing the stereorigid, activated transition metal catalyst compound at a temperature from about 80° C. to about 140° C.; and b) recovering isotactic or amorphous polypropylene chains having number average molecular weights of about 2,000 to about 30,000 Daltons.

In addition to or in place of the alumoxane, the transition metal compounds described herein can be activated by an ionizing or stoichiometric activator, neutral or ionic, such as tri (n-butyl)ammonium tetrakis(pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124, all of which are herein fully incorporated by reference. Ionic catalysts can be prepared by reacting a transition metal compound with a neutral Lewis acid, such as $B(C_6F_6)_3$, which upon reaction with the hydrolyzable ligand (X) of the transition metal compound forms an anion, such as $([B(C_6F_5)_3(X)]^-)$, which stabilizes the cationic transition metal species generated by the reaction.

Preferably, the solution comprises a hydrocarbon solvent. More preferably, the hydrocarbon solvent is aliphatic or aromatic. Also, the propylene monomers are preferably contacted at a temperature from 90° C. to 120° C. More preferably, a temperature from 95° C. to 115° C. is used. Most preferably, the propylene monomers are contacted at a temperature from 100° C. to 110° C. Reactor pressure generally can vary from atmospheric to 345 MPa, preferably to 182 MPa. The reactions can be run in batch or in continuous mode. Conditions for suitable slurry-type reactions will also be suitable and are similar to solution conditions, the polymerization typically being run in liquid propylene under pressures suitable to such.

Methods for Preparing Adhesive Compositions

Exemplary processes for preparing adhesive compositions are composed of one or more steps of (a) providing a polymer composition, (b) combining the polymer composition with one or more additives to form an adhesive composition, and (c) optionally pelletizing or drumming the adhesive composition.

Additives

Adhesive compositions comprise additives including a wax. Additives include those conventional additives known in the art, including fillers, antioxidants, adjuvants, adhesion promoters, plasticizers, natural waxes, synthetic waxes, oils, low molecular weight polymers, block, antiblock, pigments, processing aids, UV stabilizers, neutralizers, lubricants, surfactants nucleating agents, oxidized polyolefins, acid modified polyolefins, and/or anhydride modified polyolefins. Additives are combined with polymer compositions as individual components, in masterbatches, or combinations thereof.

Fillers include conventional fillers known to those skilled in the art, including titanium dioxide, calcium carbonate, barium sulfate, silica, silicon dioxide, carbon black, sand, glass beads, mineral aggregates, talc, and/or clay.

Antioxidants include conventional antioxidants known to those skilled in the art, including phenolic antioxidants, such as Irganox™ brand antioxidants available from Ciba-Geigy. In some embodiments adhesive compositions include less than about 3 wt. % anti-oxidant.

Oils include conventional oils known to those skilled in the art, including paraffinic or napthenic oils such as Primol 352, or Primol 876 available from ExxonMobil Chemical France, S.A. in Paris, France. Preferred oils include aliphatic naphthenic oils.

Plasticizers include conventional plasticizers known to those skilled in the art, including mineral oils, phthalates, or polybutenes, such as Parapol 950 and Parapol 1300 formerly available from ExxonMobil Chemical Company in Houston Tex. Preferred plasticizers include phthalates such as di-iso-undecyl phthalate (DIUP), di-iso-nonylphthalate (DINP), and dioctylphthalates (DOP).

Adhesion promoters include conventional adhesion promoters known to those skilled in the art. Adhesion promoters include polar acids, polyaminoamides, such as Versamid 115, 125, 140, available from Henkel, urethanes, such as isocyanate/hydroxy terminated polyester systems, e.g. bonding agent TN/Mondur Cb-75(Miles, Inc., coupling agents, such as silane esters (Z-6020 from Dow Corning), titanate esters, such as Kr-44 available from Kenrich, reactive acrylate monomers, such as sarbox SB-600 from Sartomer, metal acid salts, such as Saret 633 from Sartomer, and polyphenylene oxide.

Waxes include natural or synthetic, polar or non-polar waxes, polypropylene waxes, polyethylene waxes, and wax modifiers. Waxes include Fischer Tropsch waxes, available from Sasol Corporation or Bareco Corporation, polyethylene waxes, available from Baker Petrolite Corporation, Honeywell Corporation, or Eastman Corporation, oxidized high density polyethylene homopolymer waxes, available from Honeywell Corporation, or maleated polyethylene waxes, available from Eastman Corporation. In an embodiment, the wax is substantially linear. In an embodiment, the wax has a viscosity greater than about 100 cp at 190° C.

In some embodiments, a useful parameter for evaluating waxes is a softening temperature as defined by at least one of the following:

(a) mettler drop point as determined by ASTM-D3954-94, (° C.), (b) congealing point as determined by ASTM D-938, (° C.), (c) ring and ball softening point as determined by ASTM E-28, (° C.), or (d) peak melt temperature as determined by DSC, (° C.). Preferably the softening temperature is at least one of the following (a)-(d):

(a) mettler drop point as determined by ASTM-D3954-94 is greater than 110° C., (b) congealing point as determined by ASTM D-938 is greater than 110° C., (c) ring and ball softening point as determined by ASTM E-28 is greater than 110° C., or (d) peak melt temperature as determined by DSC is greater than 110° C.

Preferred waxes are mixed with a propylene-hexene copolymer having a Dot T-Peel of 1 Newton or more on Kraft paper, a Mw of 10,000 to 100,000, a branching index (g') of from 0.4 to 0.98 measured at the Mz of the polyolefin when the polyolefin has an Mw of 10,000 to 60,000, or a branching index (g') of from 0.4 to 0.95 measured at the Mz of the polyolefin when the polyolefin has an Mw of 10,000 to 100,000, so yield a set time function F that is greater than 1 and less than 3 when F is determined by the following equation:

$$F=5.26-6.9\times10^{-5}*[\text{wax viscosity at }140°\text{ C., (cp)}]-0.021*[\text{wax softening point, (° C.)}]$$

wherein the wax softening point or temperature is as previously defined. In an embodiment, the wax comprises polyethylene and imparts a set time improvement of about 33% or more compared to a reference composition prepared with the same polymer compositions and a Sasol C80 wax.

Low Mn polymers include conventional low Mn polymers known to those skilled in the art. Preferred low Mn polymers include polymers of lower alpha olefins such as propylene, butene, pentene, and hexene. A particularly preferred polymer includes polybutene having an Mn of less than 1000. An example of such a polymer is available under the trade name PARAPOL™ 950 from ExxonMobil Chemical Company. PARAPOL™ 950 is a liquid polybutene polymer having an Mn of 950 and a kinematic viscosity of 220 cSt at 100° C., as measured by ASTM D 445. In some embodiments polar and non-polar waxes are used together in the same composition.

Tackifiers, i.e., hydrocarbon resins, include conventional tackifiers known to those skilled in the art. Exemplary tackifiers include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, and hydrogenated rosin esters. In some embodiments the tackifier is hydrogenated. In other embodiments the tackifier is non-polar. Non-polar means that the tackifier is substantially free of monomers having polar groups. Preferably the polar groups are not present, however if they are preferably they are not present at more that 5 wt. %, preferably not more that 2 wt. %, even more preferably no more than 0.5 wt. %. In some embodiments the tackifier has a softening point (Ring and Ball, as measured by ASTM E-28) of 80° C. to 150° C., preferably 100° C. to 130° C.

The tackifier, if present, is typically present at about 1 wt. % to about 20 wt. %, based upon the weight of the blend, more preferably 2 wt. % to 10 wt. %, even more preferably 3 wt. % to 10 wt. %, based on the weight of the adhesive composition.

Exemplary tackifiers are commercially available as the ESCOREZ™ family, e.g., 5300, 5320, 5340, 5380, 5690, 5600, and 5620.

Adhesive compositions optionally include polymers that are functionalized. Preferred functional groups include maleic acid and maleic anhydride. Functionalized means that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably the organic compound contains an ethylenic unsaturation conjugated with a carbonyl group (—C=O). Examples include maleic, fumaric, acrylic, methacrylic, itaconic, crotonic, alpha-methyl crotonic, and cinnamic acids as well as their anhydrides, esters and salt derivatives. In a preferred embodiment the unsaturated acid or anhydride comprises a carboxylic acid or a derivative thereof selected from the group consisting of unsaturated carboxylic acids, unsaturated carboxylic acid derivatives selected from esters, imides, amides, anhydrides and cyclic acid anhydrides or mixtures thereof. Maleic anhydride is particularly preferred.

The unsaturated acid or anhydride is preferably present at about 0.1 wt. % to about 10 wt. %, preferably at about 0.5 wt. % to about 7 wt. %, even more preferably at about 1 to about 4 wt. %, based upon the weight of the hydrocarbon resin and the unsaturated acid or anhydride.

In a preferred embodiment the functionalized component is present at 0.005 wt. % to about 30 wt. %, more preferably between about 2 wt. % and about 20 wt. %, more preferably between about 2 wt. % and about 15 wt. %, more preferably between about 2 wt. % and about 10 wt. %. In some embodiments the functionalized component is present from about 2 wt. % and about 5 wt. %, based upon the weight of the adhesive composition. Preferably the functionalized component is present at 0.005 to about 10 wt. %, more preferably 0.01 to about 10 wt. %, based upon the weight of the blend.

Adhesive compositions are composed of less than about 30 wt. % total of any combination of additives described above, e.g., wax. Preferably, adhesive compositions include less than about 25 wt. % additives, or less than about 20 wt. % additives, or less than about 15 wt. % additives, or less than about 10 wt. % additives. In some embodiments, additives are present at less than about 5 wt. %, or less than about 3 wt. %, or less than about 1 wt. %, based upon the weight of the adhesive composition.

Exemplary adhesive compositions are commercially available from ExxonMobil Chemical Co. as the LINXAR™ adhesive family of products.

Adhesive Properties

The provided adhesive compositions exhibit fast sets times that are useful in the adhesive industry, e.g., the packaging industry. The adhesive composition does not set too fast or too slow such that the adhesive compositions can be used with conventional packaging equipment, e.g., cardboard box assembling equipment. Adhesives that set very quickly, e.g., less than 0.5 seconds, usually solidify before forming a sufficient bond between the materials being adhered. Similarly, adhesives that solidify very slowly, e.g., more than 10 seconds, will not form a sufficient bond between materials being adhered because conventional processing equipment require faster set times.

Some conventional polyolefin based adhesives have been unable to achieve fast set times while still maintaining sufficient adhesion properties. Unlike conventional polyolefin based adhesives, the present adhesive compositions containing polyolefins maintain favorable adhesive properties, while also exhibiting a fast set time.

Set time is defined as the time it takes for a compressed adhesive substrate construct to fasten together enough to give substrate fiber tear when pulled apart, and thus the bond is sufficiently strong to remove the compression.

Set time is measured by a dot set time test wherein a dot of adhesive composition (about 0.2 grams) at 177° C. is placed on a paper file folder. After an open time of three seconds, a second layer of paper file folder is placed on top of the adhesive composition and immediately compressed under 500 grams of weight at various amounts of time from about 0.5 to about 10 seconds ("compression time"). After the compression time, the paper file folder layers are pulled apart to check for a bonding level good enough to produce substrate fiber tear. Percentage of fiber tear, if any is recorded. Set time is defined as the minimum compression time required to achieve at least 25% fiber tear.

Once made all the specimens are pulled apart in side by side testing (at a rate of 2 inches per minute) by a machine that records the destructive force of the insult being applied. The maximum force achieved for each sample tested was recorded and averaged, thus producing the Average Maximum Force which is reported as the Dot T-Peel.

The present adhesive compositions have a set time of about 5 seconds or less, or about 4 seconds or less, or about 3 seconds or less, or about 2.5 seconds or less, or about 2 seconds or less, or about 1 second or less. Preferably, the adhesive compositions have a set time of from about 0.5 seconds to about 5 seconds, or from about 0.5 second to about 3 seconds, or from about 0.5 seconds to about 2.5 seconds.

End Uses

Adhesives compositions are used in general adhesive applications and specialty applications, including but not limited to, disposables, packaging, laminates, pressure sensitive adhesives, tapes labels, wood binding, paper binding, nonwovens, road marking, reflective coatings, and the like.

The adhesive compositions are used for disposable diaper and napkin chassis construction, elastic attachment in disposable goods converting, packaging, labeling, bookbinding, woodworking, and other assembly applications. Particularly preferred applications include: baby diaper leg elastic, diaper frontal tape, diaper standing leg cuff, diaper chassis construction, diaper core stabilization, diaper liquid transfer layer, diaper outer cover lamination, diaper elastic cuff lamination, feminine napkin core stabilization, feminine napkin adhesive strip, industrial filtration bonding, industrial filter material lamination, filter mask lamination, surgical gown lamination, surgical drape lamination, and perishable products packaging.

Adhesive compositions may be applied directly to a substrate or may be sprayed thereon. Spraying is defined to include atomizing, such as producing an even dot pattern, spiral spraying, or melt blown techniques. In general, melt blown techniques are processes that use air to spin hot melt adhesive fibers and convey them onto a substrate for bonding. Fibers sizes can easily be controlled from 20-200 microns by changing the melt to air ratio.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends.

Any of the above substrates, and/or compositions, may be corona discharge treated, flame treated, electron beam irradiated, gamma irradiated, microwaved, or silanized.

The adhesives produced herein, when coated in some fashion between two surfaces, preferably perform such that the materials are held together in a sufficient fashion compared to a standard specification or a standard adhesive similarly constructed.

Adhesive Testing

SAFT (modified D4498) measures the ability of a bond to withstand an elevated temperature rising at 10° F. (5.5° C.)/15 min., under a constant force that pulls the bond in the shear mode. Bonds were formed in the manner described above (1 inch by 3 inch (2.5 cm×7.6 cm) (on Kraft paper). The test specimens were suspended vertically in an oven at room temperature with a 500 gram load attached to the bottom. The temperatures at which the weight fell was recorded (when the occasional sample reached temperatures above the oven capacity >265° F. (129° C.) it was terminated and averaged in with the other samples at termination temperature).

Once a construct has been produced by applying an adhesive composition between two surfaces, it can be subjected to various insults in order to assess the effectiveness of the bond. Once a bond fails to a paper substrate a simple way to quantify the effectiveness is to estimate the area of the adhesive dot that retained paper fibers as the construct failed along the bond line. This estimate is called percent substrate fiber tear. An example of good fiber, after conditioning a sample for 15 hours at −12° C. and attempting to destroy the bond, would be an estimate of 80-100% substrate fiber tear. It is likely that 0% substrate fiber tear under those conditions would signal a loss of adhesion.

Certain features of the present invention are described in terms of a set of numerical upper limits and a set of numerical lower limits. It should be appreciated that ranges from any lower limit to any upper limit are within the scope of the invention unless otherwise indicated.

The above description is intended to be illustrative, and should not be considered limiting. Persons skilled in the art will recognize that various modifications may be made without departing from the spirit and scope of the invention. Accordingly, this description will be deemed to include all such modifications that fall within the appended claims and their equivalents.

EXAMPLES

The following examples, which are not intended to be limiting, present certain embodiments and advantages of adhesive compositions made from the present polyolefin compositions. Unless otherwise indicated, any percentages are on a weight basis.

A number of adhesive compositions were prepared with either a pure polymer composition or blending pure polymer compositions with functionalized additives, tackifiers, waxes, antioxidants, and/or other ingredients under shear mixing to form fluid melt. Several adhesive compositions were prepared to evaluate the effectiveness of waxes to reduce set time and maintain fiber tear.

Polymer Compositions A-E were prepared and combined with maleated polypropylene (MAPP), an anti-oxidant (irgonox), optionally a tackifier, and various waxes. The polymer compositions a Dot T-Peel of 1 Newton or more on Kraft paper, a Mw of 10,000 to 100,000, a branching index (g') of from 0.4 to 0.98 measured at the Mz of the polyolefin when the polyolefin has an Mw of 10,000 to 60,000, or a branching index (g') of from 0.4 to 0.95 measured at the Mz of the polyolefin when the polyolefin has an Mw of 10,000 to 100,000.

Polymer Composition A had a heat of fusion of 38 J/g, hexene copolymer content of 0 wt. %, and a melt temperature of 129° C. Polymer composition B had a heat of fusion of 32 J/g, a viscosity at 190° C. of 1375 cp, a hexene copolymer content of 10 wt. %, and a melt temperature of 124° C. Polymer composition C had a heat of fusion of 43 J/g, a viscosity at 190° C. of 850 cp, and a hexene copolymer content of 10 wt. %, and a melt temperature of 124° C. Polymer composition D had a heat of fusion of 49 J/g, a viscosity at 190° C. of 947 cp, a hexene copolymer content of 10 wt. %, and a melt temperature of 126° C. Polymer composition E had a heat of fusion of 52 J/g, a viscosity at 190° C. of 1000 cp, a hexene copolymer content of 10 wt. %, and a melt temperature of 127° C.

The following materials were used in examples identified in the following tables.

| Designation | Description | Source |
|---|---|---|
| C80 | Fischer Tropsch fractionated wax | Sasol |
| Polywax 500 | PE homopolymer | Baker Petrolite |
| Polywax 1000 | PE homopolymer | Baker Petrolite |
| Polywax 3000 | PE homopolymer | Baker Petrolite |
| PX 105 | Fischer Tropsch | Bareco |
| A-C 9 | PE homopolymer | Honeywell |
| A-C 392 | oxidized HDPE homopolymer | Honeywell |
| A-C 673-P | oxidized PE homopolymer | Honeywell |
| A-C 680-A | PE homopolymer | Honeywell |
| A-C 810-A | PE homopolymer | Honeywell |
| A-C 820A | PE homopolymer | Honeywell |
| Epolene C-10 | Polyethylene | Eastman |
| Epolene C-16 | Maleated polyethylene | Eastman |
| Epolene C-18 | Maleated polyethylene | Eastman |
| MAPP | Maleated polypropylene | |
| PA | Phenolic antioxidant | |
| HCR | Cycloaliphatic hydrocarbon resin with a softening point of 100 to 110° C. | ExxonMobil |
| File folder | File folder is a typical manila letter size (⅓ cut) stock having a minimum of 10% post consumer recycle paper content | Smead Paper, stock number 153L, UPC number 10330 |

Referring to Table I, adhesive composition composed of polymer composition A and wax nos. 6, 7, and 9 performed better than most adhesive compositions, including adhesive composition no. 4.

Referring to Table II, adhesive composition composed of polymer composition B and the following waxes, AC 820, Polywax 3000 performed better than most other adhesive compositions, including adhesive composition AC 6, AC 16, EP C10, EP C18, and AC 400.

Referring to Table III, adhesive composition composed of polymer composition C and wax Polywax 3000 and AC392 performed better than most adhesive compositions.

Referring to Table IV, adhesive composition composed of polymer composition A and Polywax 3000 performed better than most adhesive compositions.

TABLE I

| POLYMER COMPOSITION A | | | | | | | |
|---|---|---|---|---|---|---|---|
| | 1 | 2 | 3 | 4 | 5 | 6 | 7 |
| Polymer Comp. A | 86.5% | 86.5% | 90.0% | 90.0% | 90.0% | 90.0% | 90.0% |
| HCR | 3.5% | 3.5% | 3.5% | 3.5% | 3.5% | 3.5% | 3.5% |
| C-80 | 7% | | | | | | |
| Paraflint H-1 | | 7% | | | | | |
| A-C 9 | | | 7% | | | | |
| A-C 16 | | | | 7% | | | |
| A-C 725 | | | | | 7% | | |
| A-C 820 | | | | | | 7% | |
| Polywax 500 | | | | | | | 7% |
| Polywax 1000 | | | | | | | |
| Polywax 2000 | | | | | | | |
| Polywax 3000 | | | | | | | |
| Epolene C10 | | | | | | | |
| Epolene C16 | | | | | | | |
| Epolene C18 | | | | | | | |
| MAPP | 2% | 2% | 2% | 2% | 2% | 2% | 2% |
| PA | 1% | 1% | 1% | 1% | 1% | 1% | 1% |
| FIBER TEAR | | | | | | | |
| Cardboard 46A at 2° C. | 92 | 0 | 72 | 98 | 83 | 42 | 88 |
| Cardboard 46A at −18° C. | 0 | 0 | 13 | 35 | 49 | 0 | 30 |
| Cardboard 46A at 25° C. | 2.25 | 2.5 | 2.5 | 4.3 | 2.5 | 2.0 | 2.0 |
| Set Time (Sec) | 2.25 | 2.5 | 2.5 | 4.3 | 2.5 | 2.0 | 2.0 |
| | 8 | 9 | 10 | 11 | 12 | 13 | |
| Polymer Comp. A | 90.0% | 90.0% | 90.0% | 90.0% | 90.0% | 90.0% | |
| HCR | 3.5% | 3.5% | 3.5% | 3.5% | 3.5% | 3.5% | |
| C-80 | | | | | | | |
| Paraflint H-1 | | | | | | | |
| A-C 9 | | | | | | | |
| A-C 16 | | | | | | | |
| A-C 725 | | | | | | | |
| A-C 820 | | | | | | | |
| Polywax 500 | | | | | | | |
| Polywax 1000 | 7% | | | | | | |
| Polywax 2000 | | 7% | | | | | |
| Polywax 3000 | | | 7% | | | | |
| Epolene C10 | | | | 7% | | | |
| Epolene C16 | | | | | 7% | | |
| Epolene C18 | | | | | | 7% | |
| MAPP | 2% | 2% | 2% | 2% | 2% | 2% | |
| PA | 1% | 1% | 1% | 1% | 1% | 1% | |

TABLE I-continued

POLYMER COMPOSITION A

FIBER TEAR

| | | | | | | |
|---|---|---|---|---|---|---|
| Cardboard 46A at 2° C. | 0 | 0 | 83 | 90 | 92 | 92 |
| Cardboard 46A at −18° C. | 0 | 0 | 0 | 55 | 9 | 70 |
| Cardboard 46A at 25° C. | 2.5 | 2.5 | 2.0 | 3.0 | 3.5 | 3.0 |
| Set Time (Sec) | 2.5 | 2.5 | 2.0 | 3.0 | 3.5 | 3.0 |

TABLE II

POLYMER COMPOSITION B

| | C-80 | H1 | H4 | AC 6 | AC 8 | AC 9 | AC 16 | AC 725 | AC 820 |
|---|---|---|---|---|---|---|---|---|---|
| Polymer Comp. B | 86.5% | 86.5% | 86.5% | 86.5% | 86.5% | 86.5% | 86.5% | 86.5% | 86.5% |
| HCR | 3.5% | 3.5% | 3.5% | 3.5% | 3.5% | 3.5% | 3.5% | 3.5% | 3.5% |
| C-80 | 7% | | | | | | | | |
| Paraflint H-1 | | 7% | | | | | | | |
| Paraflint H-4 | | | 7% | | | | | | |
| A-C 6 | | | | 7% | | | | | |
| A-C 8 | | | | | 7% | | | | |
| A-C 9 | | | | | | 7% | | | |
| A-C 16 | | | | | | | 7% | | |
| A-C 725 | | | | | | | | 7% | |
| A-C 820 | | | | | | | | | 7% |
| Polywax 500 | | | | | | | | | |
| Polywax 1000 | | | | | | | | | |
| Polywax 2000 | | | | | | | | | |
| Polywax 3000 | | | | | | | | | |
| Epolene C10 | | | | | | | | | |
| Epolene C16 | | | | | | | | | |
| Epolene C18 | | | | | | | | | |
| A-C 400 | | | | | | | | | |
| PX-105 | | | | | | | | | |
| MAPP | 2% | 2% | 2% | 2% | 2% | 2% | 2% | 2% | 2% |
| PA | 1% | 1% | 1% | 1% | 1% | 1% | 1% | 1% | 1% |
| FIBER TEAR | | | | | | | | | |
| Cardboard 46A at 2° C. | 66 | 0 | 0 | 92 | 100 | 98 | 100 | 100 | 89 |
| Cardboard 46A at −18° C. | 62 | 0 | 0 | 43 | 65 | 0 | 91 | 88 | 0 |
| Cardboard 46A at 25° C. | 98 | 35 | 40 | 100 | 100 | 100 | 100 | 100 | 99 |
| Set Time (Sec) | 3 | 2.5 | 2.5 | 4.3 | 3.5 | 3.3 | 5.8 | 3.5 | 2.0 |

| | POLY 500 | POLY 1000 | POLY 2000 | POLY 3000 | Ep C10 | Ep C16 | Ep C18 | AC 400 | PX 105 |
|---|---|---|---|---|---|---|---|---|---|
| Polymer Comp. B | 86.5% | 86.5% | 86.5% | 86.5% | 86.5% | 86.5% | 86.5% | 86.5% | 86.5% |
| HCR | 3.5% | 3.5% | 3.5% | 3.5% | 3.5% | 3.5% | 3.5% | 3.5% | 3.5% |
| C-80 | | | | | | | | | |
| Paraflint H-1 | | | | | | | | | |
| Paraflint H-4 | | | | | | | | | |
| A-C 6 | | | | | | | | | |
| A-C 8 | | | | | | | | | |
| A-C 9 | | | | | | | | | |
| A-C 16 | | | | | | | | | |
| A-C 725 | | | | | | | | | |
| A-C 820 | | | | | | | | | |

TABLE II-continued

POLYMER COMPOSITION B

| | | | | | | | | | |
|---|---|---|---|---|---|---|---|---|---|
| Polywax 500 | 7% | | | | | | | | |
| Polywax 1000 | | 7% | | | | | | | |
| Polywax 2000 | | | 7% | | | | | | |
| Polywax 3000 | | | | 7% | | | | | |
| Epolene C10 | | | | | 7% | | | | |
| Epolene C16 | | | | | | 7% | | | |
| Epolene C18 | | | | | | | 7% | | |
| A-C 400 | | | | | | | | 7% | |
| PX-105 | | | | | | | | | 7% |
| MAPP | 2% | 2% | 2% | 2% | 2% | 2% | 2% | 2% | 2% |
| PA | 1% | 1% | 1% | 1% | 1% | 1% | 1% | 1% | 1% |
| FIBER TEAR | | | | | | | | | |
| Cardboard 46A at 2° C. | 71 | 0 | 0 | 95 | 91 | 98 | 93 | 99 | 0 |
| Cardboard 46A at −18° C. | 70 | 0 | 0 | 77 | 84 | 83 | 77 | 77 | 0 |
| Cardboard 46A at 25° C. | 95 | 0 | 99 | 99 | 98 | 99 | 97 | 100 | 45 |
| Set Time (Sec) | 3.3 | 2.5 | 2.25 | 2.0 | 4.0 | 4 | 4.8 | 4.5 | 2.5 |

TABLE III

POLYMER COMPOSITION C

| | SET TIME 7% | SET TIME 4% | % FT 2 C. RT 7% | % FT RT 4% | % FT 7% | % FT 2 C. 4% | % FT −18 C. 7% | % FT −18 C. 4% | 177 VISC 7% | 177 VISC 4% |
|---|---|---|---|---|---|---|---|---|---|---|
| Polywax 500 | 2.25 | 3.5 | 95 | 97 | 95 | 92 | 78 | 57 | 693 | 1145 |
| Polywax 1000 | 4.5 | 2.75 | 0 | 4 | 0 | 2 | 0 | 0 | 973 | 1042 |
| Polywax 3000 | 1.75 | 2.25 | 84 | 83 | 79 | 73 | 30 | 49 | 1060 | 1157 |
| Bareco PX 105 | 2.5 | 2.5 | 0 | 66 | 0 | 1 | 0 | 0 | 935 | 1230 |
| A-C 392 | 1.75 | 2 | 96 | 88 | 48 | 85 | 50 | 20 | 1300 | 1317 |
| C80 | 2.25 | 3.5 | 96 | 93 | 92 | 85 | 66 | 89 | 775 | 1175 |
| A-C9 | 2.5 | 3 | 86 | 89 | 51 | 83 | 15 | 63 | 955 | 1135 |
| A-C 673-P | 3 | 2.75 | 82 | 75 | 64 | 58 | 0 | 11 | 1232 | 1292 |
| A-C 680-A | 2.5 | 3.75 | 46 | 84 | 3 | 55.0 | 0 | 0 | 1147 | 1367 |
| A-C 810-A | 2.25 | 3.25 | 0 | 97 | 6 | 57 | 0 | 0 | 783 | 1067 |
| A-C-820 | 1.75 | 2.5 | 68 | 93 | 35 | 85 | 7 | 23 | 975 | 1157 |

TABLE IV

POLYMER COMPOSITIONS D & E

| POLYMER COMPOSITION | BLENDS | SET TIME | % FIBER TEAR INLAND RT | % FIBER TEAR INLAND 2 C. | % FIBER TEAR INLAND −18 C. | VISCOCITY 177 C. |
|---|---|---|---|---|---|---|
| D | 4.5% Polywax 3000, 3% MAPP, 0.9% PA | 2 | 98 | 84 | 49 | 1102 |
| D | 4.5% POLYWAX 3000, 3% AC1622, 0.9% PA | 2+ | 94 | 68 | 38 | 1015 |
| D | 5% C80, 3% MAPP, 0.9% PA | 3− | 97 | 94 | 91 | 1050 |
| D | 5% C80, 3% AC1622, 0.9% PA | 3 | 96 | 94 | 82 | 955 |
| D | 5% POLYWAX 3000, 3% MAPP, 0.9% PA 400 Gram Batch | 1.5 | 95 | 72 | 66 | 1117 |
| D | 5% POLYWAX 3000, 3% MAPP, 0.9% PA | 2 | 92 | 77 | 63 | 1047 |
| D | 2% POLYWAX 3000, 3% MAPP, 0.9% PA | 3+ | 95 | 90 | 92 | 1302 |

TABLE IV-continued

POLYMER COMPOSITIONS D & E

| POLYMER COMPOSITION | BLENDS | SET TIME | % FIBER TEAR INLAND RT | % FIBER TEAR INLAND 2 C | % FIBER TEAR INLAND −18 C. | VISCOCITY 177 C. |
|---|---|---|---|---|---|---|
| D | 7% POLYWAX 3000, 3% MAPP, 0.9% PA | 2 | 91 | 89 | 56 | 980 |
| D | 4% POLYWAX 3000, 3% AC 596, 0.9% PA | 2+ | 91 | 91 | 76 | |
| D | 4% POLYWAX 3000, 3% MAPP, 0.9% PA | 2 | 93 | 92 | 83 | |
| E | 6% POLYWAX 3000, 3% MAPP, 0.9% PA | 2 | 90 | 87 | 71 | 1117 |
| E | 4% POLYWAX 3000, 3% MAPP, 0.9% PA | 2.25 | 94 | 94 | 84 | |

TABLE V

| | FAMILY | METTLER DROP, ASTM-D3954-94 °C. | R & B SOFTENING POINT °C. | ONGEALING POINT ASTM D-938 °C. | Tm °C. | VISCOSITY AT TEMP 99° C. | 140° C. | 150° C. | 160° C. | Mw |
|---|---|---|---|---|---|---|---|---|---|---|
| SASOL C80 | FISCHER TROPSCH | | | 80 | | | 4 | | | |
| BAKER PETROLITE POLYWAX 500 | PE HOMOPOLYMER | | | | | 88 | 5 | | | 500 |
| BAKER PETROLITE POLYWAX 1000 | PE HOMOPOLYMER | | | | | 113 | 15 | | | 1000 |
| BAKER PETROLITE POLYWAX 3000 | PE HOMOPOLYMER | | | | | 129 | 130 | | | 3000 |
| BARECO PX 105 | PE HOMOPOLYMER | | | 105 | | 110 | | | | |
| HONEYWELL A-C 9 | OXIDIZED HDPE HOMOPOLYMER | 115 | | | | | 450 | | | |
| HONEYWELL A-C 673-P | OXIDIZED PE HOMOPOLYMER | 138 | | | | | 400 | | | |
| HONEYWELL A-C 680-A | PE HOMOPOLYMER | 110 | | | | | 250 | | | |
| HONEYWELL A-C 810-A | PE HOMOPOLYMER | 108 | | | | | 20 | | | |
| HONEYWELL A-C 820-A | PE HOMOPOLYMER | 121 | | | | | 100 | 84 | 71 | |
| EASTMAN EPOLENE C-10 | PE | 103 | 102 | | | | 16650 | 8200 | | 35000 |
| EASTMAN EPOLENE C-16 | Ma-PE | 103 | 102 | | | | 10000 | 8100 | | 26000 |
| EASTMAN EPOLENE C-18 | Ma-PE | 101 | 101 | | | | 5000 | 4100 | | 15000 |

What is claimed is:

1. An adhesive composition comprising:
   (1) a polyolefin composition comprising at least about 50 mol % of a polypropylene, and
   (2) at least one wax, wherein the at least one wax comprises a linear polyethylene wax having a molecular weight equal to or greater than 3000; and
   (3) wherein the adhesive composition is free of tackifier;
   (A) wherein the polyolefin composition has:
      (a) a Dot T-Peel of 1 Newton or more on Kraft paper,
      (b) an Mw of 10,000 to 100,000,
      (c) a branching index (g') of from 0.4 to 0.98 measured at the Mz of the polyolefin when the polyolefin has an Mw of 10,000 to 60,000, or a branching index (g') of from 0.4 to 0.95 measured at the Mz of the polyolefin when the polyolefin has an Mw of 10,000 to 100,000;
   (B) wherein the at least one wax has a viscosity at 140° C. of between about 100 cp and about 10,000 cp and a wax softening point greater than 110° C. such that a set time function F is greater than 1 and less than 3, wherein F is calculated according to the following equation:

$F = 5.26 - 6.9 \times 10^{-5} * [\text{wax viscosity at } 140°\text{ C., (cp)}] - 0.021 * [\text{wax softening point, (° C.)}]$ wherein the wax softening point is determined by at least one of:
      (a) mettler drop point as determined by ASTM-D3954-94;
      (b) congealing point as determined by ASTM D-938;
      (c) ring and ball softening point as determined by ASTM E-28; or
      (d) peak melt temperature as determined by DSC; and
   (C) wherein the adhesive composition has a set time greater than about 1 second and less than about 3 seconds as measured by Dot Set Time; and
   (D) wherein the adhesive composition has a fiber tear at 2° C. of about 20% or greater.

2. The adhesive composition of claim 1, wherein the set time is from about 1.5 seconds to about 3 seconds as measured by Dot Set Time.

3. The adhesive composition of claim 1, wherein the set time is from about 1.5 seconds to about 2.5 seconds as measured by Dot Set Time.

4. The adhesive composition of claim 1, wherein the linear polyethylene wax has a viscosity greater than about 100 cp at 190° C.

5. The adhesive composition of claim 1, wherein the linear polyethylene wax has a peak melt point greater than about 110° C.

6. The adhesive composition of claim 1, wherein the linear polyethylene wax comprising polyethylene imparts a set time improvement of about 33% or more compared to a reference composition prepared with the same polymer compositions and a Fischer Tropsch wax having a congealing point per ASTM D-938 of 80° C.

7. The adhesive composition of claim 1, wherein the adhesive composition has a fiber tear at 2° C. of about 20% or greater.

8. An adhesive composition, comprising:
(1) a polyolefin composition comprising at least about 50 mol % of a polypropylene,
(2) at least one wax, wherein the at least one wax comprises a linear polyethylene wax having a molecular weight equal to or greater than 3000, a viscosity at 140° C. of between about 100 cp and about 10,000 cp, and a viscosity greater than about 100 cp at 190° C.; and
(3) wherein the adhesive composition is free of tackifier;
(A) wherein the polyolefin composition has:
  (a) a Dot T-Peel of 1 Newton or more on Kraft paper,
  (b) an Mw of 10,000 to 100,000,
  (c) a branching index (g') of from 0.4 to 0.98 measured at the Mz of the polyolefin when the polyolefin has an Mw of 10,000 to 60,000, or a branching index (g') of from 0.4 to 0.95 measured at the Mz of the polyolefin when the polyolefin has an Mw of 10,000 to 100,000;
(B) wherein the at least one wax has a wax softening point greater than 110° C. such that a set time function F is greater than 1 and less than 3, wherein F is calculated according to the following equation:

$$F = 5.26 - 6.9 \times 10^{-5} * [\text{wax viscosity at } 140° \text{C., (cp)}] - 0.021 * [\text{wax softening point, (° C.)}]$$

wherein the wax softening point is determined by at least one of:
  (a) mettler drop point as determined by ASTM-D3954-94;
  (b) congealing point as determined by ASTM D-938;
  (c) ring and ball softening point as determined by ASTM E-28; or
  (d) peak melt temperature as determined by DSC;
(C) wherein the adhesive composition has a set time greater than about 1 second and less than about 3 seconds as measured by Dot Set Time; and
(D) wherein the adhesive composition has a fiber tear at 2° C. of about 20% or greater.

* * * * *